March 21, 1961 — E. J. ROUSEK — 2,975,936
PLANTING OF SEEDS
Filed Nov. 24, 1958 — 2 Sheets-Sheet 1
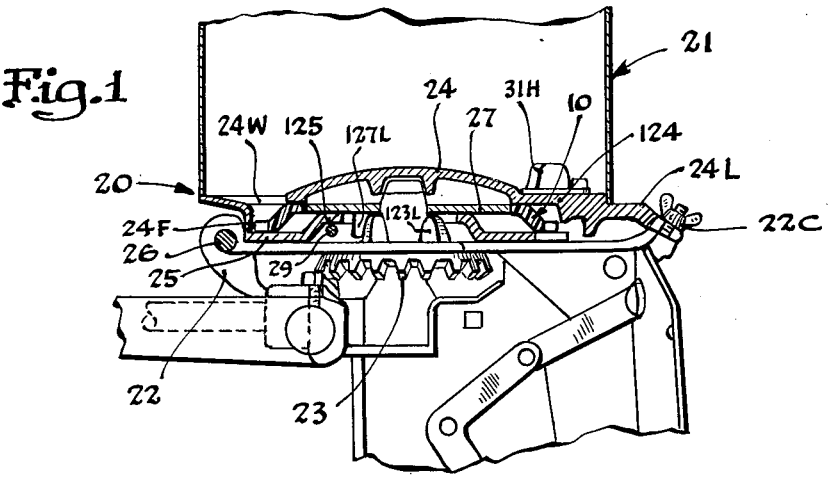
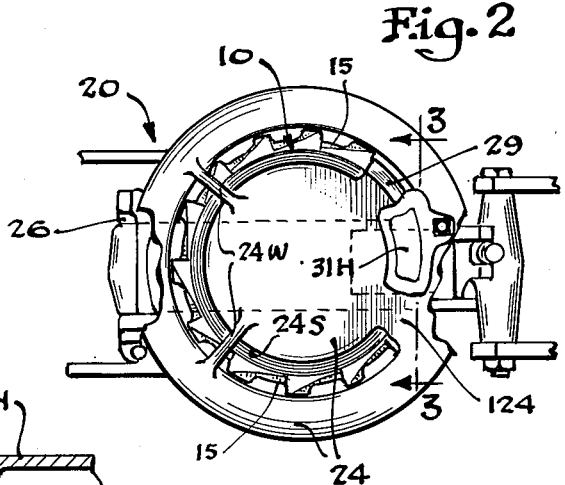
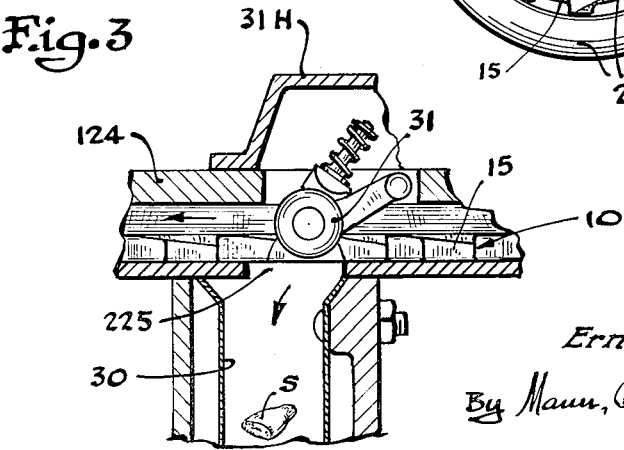
Inventor
Ernest J. Rousek
By Mann, Brown & McWilliams
Attorneys March 21, 1961 E. J. ROUSEK 2,975,936
PLANTING OF SEEDS
Filed Nov. 24, 1958 2 Sheets-Sheet 2

Inventor
Ernest J. Rousek
By Mann, Brown & McWilliams
Attorneys

United States Patent Office 2,975,936
Patented Mar. 21, 1961

2,975,936

PLANTING OF SEEDS

Ernest J. Rousek, Lincoln, Nebr., assignor to Genetic Giant AG.-Products Co., a corporation of Nebraska Filed Nov. 24, 1958, Ser. No. 775,877

3 Claims. (Cl. 221—265)

This invention relates to the planting of seeds and particularly to planter plates used in seed planters and the proper coordination of the planter plates with the size and shape of the seed to be planted.

Planters employed on farms for planting seed such as corn and the like customarily provide a separate seed container or planter box for each row that is to be planted and at the bottom of the container, means are provided, driven either continuously or intermittently from or in timed relation to the implement wheels, for separating and feeding the seed one at a time from the container either for individual planting or for collection into groups for hill or check-row planting. As an important part of such separating and feeding means it is the universal practice to employ a rotative disk-like planter plate having a plurality of seed pockets or cells about its periphery or edge into which the individual seeds may fall as the planter plate is rotated and from which the seeds are individually discharged in succession at a predetermined point in the rotation of the planter plate.

After the farmer has obtained his seed and has started planting, it is often found that there will be skips in the feeding action, or grinding or cracking of the seeds due to an improper relation between the seeds and the seed cells. Because of this the farmer often attempts to alter to size or shape of the seed cells of his planter plate to more exactly match the seed. This has involved the difficult and time consuming operation of filing the sides of each cell of the cast iron planter plate.

As above pointed out, planters of the aforesaid character have been in use for many years, and with the parts made from cast iron as is the practice in the trade, there is considerable friction in the planter, and because of the rough surfaces of the cast iron planter plates, there is a tendency toward wearing away of the outer surface of the seed. This wearing away tendency that has been caused by the cast iron planter plate heretofore used has become particularly troublesome in recent years where seed planters of this kind have been used to handle treated or coated seeds. Such treated seeds have a coating of material thereon that comprises or includes various fungicides and insecticides, and the action of the cast iron planter plates upon such coatings has been found to be the source of a great deal of trouble in handling such seeds. Thus the wearing action of the cast iron plate on the seeds loosens a slight bit of the coating material from many of the seeds with the result that this coating material accumulates in the seed pockets so that the seed pockets will not accommodate the seeds of the intended size and shape. Further, the coating material is relatively fragile so that any clogging tendency that may be present in the planter, particularly at the cut-off plate thereof, tends to crack the coating so as to accelerate the accumulation of displaced coating material within the planter box and in the seed pockets.

In view of the foregoing it is the primary object of the present invention to simplify the use and improve the performance of the planters of the aforesaid kind, and an object related to the foregoing is to provide a new and improved planter plate for such planters that will minimize friction in the planter, minimize cracking of the seed, prevent or reduce the wearing away and objectionable accumulation of seed coating material, and which may be readily and easily cut to modify the shape and size of the seed cells.

Other and further objects of the present invention will be apparent from the following description and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

Fig. 1 is a fragmentary vertical sectional view through a seed planter having a planter plate embodying the invention;

Fig. 2 is a plan view of the structure shown in Fig. 1;

Fig. 3 is a sectional view taken along the line 3—3 of Fig. 2;

Figure 4:
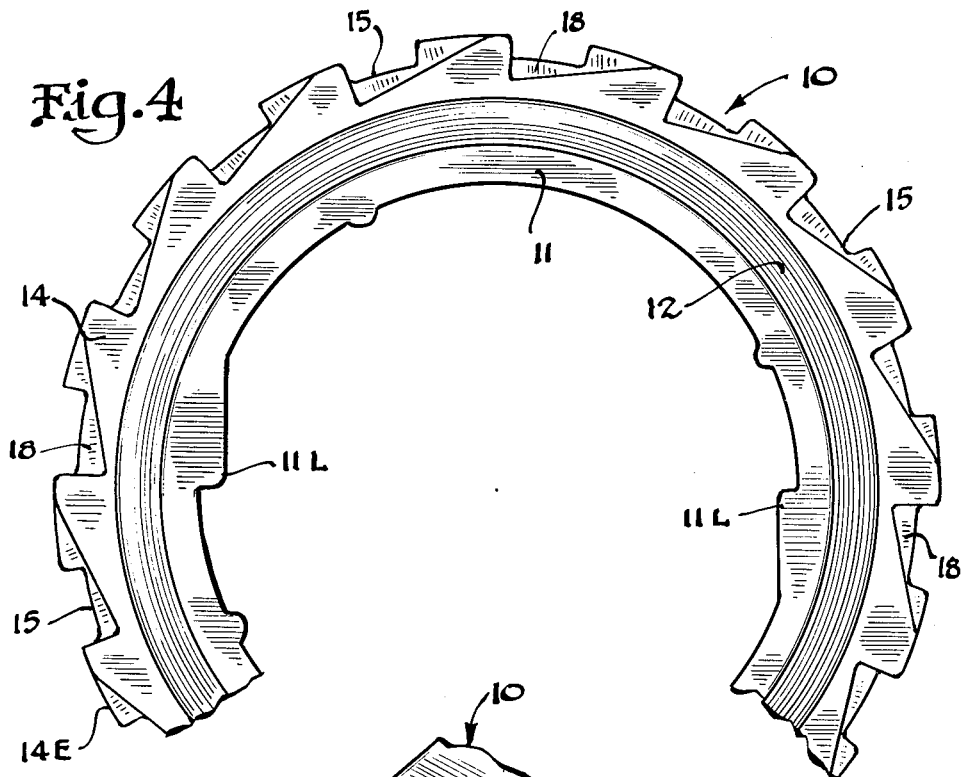
Fig. 4 is an enlarged plan view of a planter plate embodying the invention.

For purposes of disclosure the invention is herein illustrated as embodied in a planter plate 10 mounted in a conventional Deere & Company planter 20. The planter 20 comprises a planter box 21 supported on a base frame 22 that carries a drive gear 23 on a vertical axis beneath and centrally of the planter box 21. The planter box 21 has a sectional bottom comprising a main wall 24 and a lower wall 25, both of which are pivoted at one edge on the base frame 22 by a horizontal pivot 26. At its other edge the main wall 24 has a projecting lug 24L adapted to be releasably engaged by a clamping screw and nut device 22C to hold the planter box 21 in its upright position.

The main bottom wall 24 has an arcuate slot 24S formed therein centered on the axis of the drive gear 23, the slot 24S being bridged at intervals by spokes or webs 24W, while between the ends of the slot, a portion of the wall 24 forms what is known as a cut-off wall 124.

Figure 5:
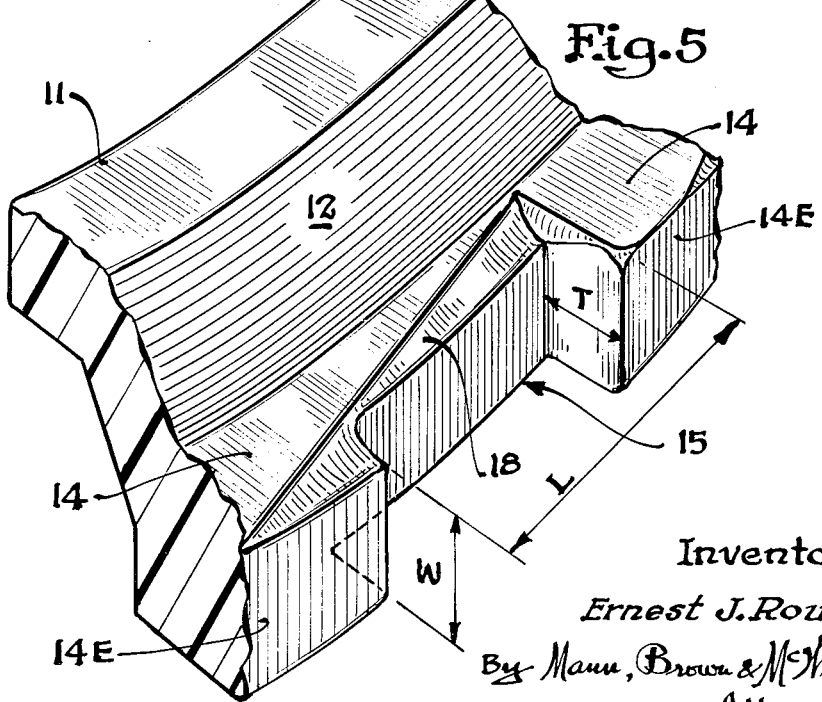
Fig. 5 is a fragmentary perspective view showing one seed cell of the planter plate.

The planter plate 10 is generally in the form of a ring as shown in Fig. 4, and is mounted in the space between the main wall 24 and the lower wall 25, as shown in Figs. 1 and 2, so that a substantial portion of the planter plate 10 is exposed beneath the slot 24S. The cross sectional form of the planter plate 10 provides an inner flange 11 lying in an upper plane, an intermediate body portion 12 sloping outwardly and downwardly, and an outer flange 14 disposed in a lower plane and extending outwardly from the body portion 12 to provide an outer edge 14E as indicated in Figs. 4 and 5. The inner flange 11 has a pair of drive lugs 11L thereon that project inwardly for engagement with complemental drive lugs formed on the outer edge of a drive plate 27.

The planter plate 10 is put in its position of use by releasing the clamp device 22C and tilting the planter box 21 to an inverted position. A spring wire fastener 29 acting between the lower wall 25 and the main wall 24 is then released, and after separating the wall 25 from the wall 24, the planter plate 10 is put in position with the lugs 11L in position for driving engagement by the lugs of the drive plate 27. The fastener 29 is then secured to hold the walls 24 and 25 together with the drive plate 27 and the planter plate 10 therebetween, and the planter box 21 then is returned to and clamped in its upright position.

When thus positioned the flange 14 of the planter plate 10 rides on the upper surface of the lower plate 25, and the outer edge 14E of the outer flange 14 rides in closely spaced relation to a downward annular flange 24F formed on the main wall 24. The flange 14 and the sloping portion 12 are exposed beneath the arcuate slot 24S so that seeds contained within the planter box 21 may enter seed cells 15 formed in and extending through the flange 4. The seed cells 15 as herein shown are formed as edge notches in the flange 14. The flange 11 of the planter plate 10 rides beneath the main wall 24, and drive plate 27 is supported in the plane of the flange 11 by an upwardly displaced central portion 125 of the lower wall 25. The central portion 125 has a central opening and drive lugs 127L on the drive plate 27 which project downwardly through this opening for driving engagement by lugs 123L on the drive gear 23.

As the planter plate 10 is rotated the seeds cells 15 are removed in succession beneath a resilient cut-off spring 29 carried on and projecting from one edge of the cut-off wall 124; and each cell then moves under the cut-off wall 124 and into position over a discharge opening 225 in the bottom wall 25. A seed S, Fig. 3, that has been carried to this position in a cell 15 may then be discharged downwardly through the opening 225 into a seed tube or chute 30. Such discharge may be facilitated by a spring-urged knocker wheel 31, Fig. 3, mounted on the wall 124 within a housing 31H.

The present invention is concerned with the planter plate per se, as will be described, and it should be noted therefore that with the exception of the planter plate 10, the specific structure above described constitutes one conventional form of planter. Thus, the present invention is applicable to different types of conventional planters, and for use with such different types of planters, the specific form of the planter plate 10 is selected to meet the requirements of the planter for which it is intended.

Under and in accordance with the present invention the planter plate 10 is formed by molding from a light weight plastic material which when molded has a smooth wax-like surface to resist adherence of chemicals used in seed treatment and which has high impact and abrasion resistance and which may be easily cut to modify the shape of the seed cells in the field. Such materials, of course, are relatively rigid so that the requisite driving forces may be applied to the planter plate. Plastic materials that meet these requirements are cellulose acetate butyrate, high impact polystyrene, and polyethylene, and of these I prefer to employ cellulose acetate butyrate which, although more costly than the others, appears to possess somewhat greater abrasion resistance.

The selected plastic material is shaped in molds having the die cavity formed with smooth surfaces so that the surfaces of the planter plate 10 are smooth, and this smoothness, coupled with the wax-like surface characteristic resulting from the use of the selected plastic, serves to minimize friction between the planter plate 10 and the stationary surfaces of the planter box, and also minimizes wearing away or breaking of the seeds or seed coatings. Furthermore, the smooth, wax-like surface of the planter plate 10 resists adherence of powdered chemical that may be worn from the seed coating, or which may be put into the planter box in powdered form by the user for distribution with the seeds. This practice of adding powdered chemical such as insecticide has become quite common, and although it has caused considerable trouble by adhering to and caking on cast iron planter plates, I have found that with planter plates of the present invention there is no objectionable adherence to the planter plate, so that such material is handled without adversely affecting the seed-feeding function.

As pointed out hereinabove, seeds are sorted into different classifications according to the size and shape of the seed, and the seed cells of the planter plates are sized according to the seed classification of the seed with which they are to be used. Thus, as indicated in Fig. 5, the circumferential dimension L of a seed cell 15 is established according to the length of the seed to be planted; the radial depth T of the seed cell is established according to the thickness of the seed; while the vertical dimension W is established according to the width of the seed. The dimension W is established by an angular cut 18 that extends inwardly from the outer upper edge 14E and in a rearward or reverse direction so that this angular cut reduces the effective height of the edge surface 14E at the leading edge of the seed cell 15.

When the planter plate 10 is made from any of the plastic materials above noted, the form and dimensions of the seed cells 15 may be modified easily by the farmer in the field merely by the use of a sharp pocket knife, and thus the user may establish a uniform seed feeding action even though the planter plate selected was not originally effective to do this.

The planter plates 10 of the present invention, being made of plastic, may be produced in a variety of colors, and since such colors are embodied in the plastic material, this color will be maintained throughout the useful life of the planter plates. This characteristic is utilized under the present invention to simplify the selection of planter plates having a cell classification or cell size that is proper for the particular classification of seed that is to be used. Thus, a different color of plastic is allocated to each different size or cell classification, and this same color coding is applied to the packages of seeds of different classifications. To illustrate the advantageous coordination that is attained between the planter plates and the seed classifications, the following example is given:

| Seed Classification as to Size and Shape | Coordinating Code Color for Labels and Plates | Cell Classification of Planter Plates as to Size and Shape |
| --- | --- | --- |
| Long Flat | Light Red | Long Flat. |
| Medium Flat | Medium Red | Medium Flat. |
| Short Flat | Dark Red | Short Flat. |
| Long Round | Light Blue | Long Round. |
| Medium Round | Medium Blue | Medium Round. |
| Short Round | Dark Blue | Short Round. |

The seed of each classification is thus packaged in bags or boxes carrying labels of a color conforming to the classification of such seed, and if the farmer does not have planter plates of this particular color he may then select planter plates which bear this same color code and which are therefore provided with seed cells of a size and shape that is best adapted for planting the seeds of the selected classification.

This color coded representation and identification of the seed cell size is useful not only in the initial merchandising of the planter plates, but also in subsequent selection thereof from a stock of planter plates that the farmer may have on hand. Thus, where a number of these plates of different color are stores in a bin or the like, the farmer may readily pick out those which have the same color as the coded color carried by the seed that he has purchased. Or in the other instance, where the seed does not bear such a color code, the farmer may, by matching the seed with the seed cells of planter plates of different colors, determine that a planter plate of a particular color is best adapted to feed the particular seed that he has on hand. He may then quickly select additional planter plates of the same classification merely by picking out those plates that have the same color as the one that he has previously selected.

Furthermore, the planter plates that have cell classifications corresponding to the most common seed classes may be arranged in sets with one planter plate for each such seed classification, and the farmer may purchase the entire set, or several such sets, and by reason of color coding thereof may readily select from such sets planter plates that will best serve his needs with any particular seed that he may have on hand.

From the foregoing description it will be apparent that the invention simplifies the use of and improves the performance of planter plates, and also, it will be apparent that the present invention minimizes the friction in the planter and reduces the cracking and wearing away of the seed or the seed coating. Furthermore, it will be apparent that planter plates according to the present invention may be readily modified in the field to change the size and shape of seed cells.

It will also be apparent that the present invention simplifies the selection of planter plates and the coordination thereof with the seed that is to be planted, and the planter plates of this invention also resist adherence of foreign material to the planter plate, thus minimizing skips and like faulty operations of the planter plate.

Thus, while a preferred embodiment of the invention has been illustrated herein, it is to be understood that changes and variations may be made by those skilled in the art without departing from the spirit and scope of the appending claims.

I claim:

1. A planter plate for use in conventional seed planters and comprising an annular ring formed from a relatively rigid resilient plastic material with integral drive lugs on its inner periphery and its outer peripheral portion providing seed cells that may readily be modified as to size and shape by cutting of the plastic and having the ring formed with smooth surfaces to minimize friction between the ring and the stationary parts of the planter and between the ring and the seed supply in such a planter.

2. A planter plate for use in conventional seed planters and comprising an annular ring formed from a relatively rigid resilient plastic material having high shock resistance and with said ring having abutments thereon for receiving driving forces and having seed cells that may be readily modified as to size and shape by cutting of the plastic and having the ring formed with smooth surfaces to minimize friction and reduce adherence of foreign substances thereto.

3. A planter plate for use in conventional seed planters and comprising an annular ring formed from a plastic material selected from the group including cellulose acetate butyrate, high impact polystyrene and polyethylene to provide a ring having abutments thereon for receiving driving forces and having seed cells in its outer peripheral portion that may readily be modified as to size and shape by cutting of the plastic and having the ring formed with smooth surfaces to minimize friction and reduce adherence of foreign substances thereto.

References Cited in the file of this patent

UNITED STATES PATENTS

| | | |
|---|---|---|
| 175,065 | Garrett | Mar. 21, 1876 |
| 257,951 | Keller | May 16, 1882 |
| 295,263 | Matthews et al. | Mar. 18, 1884 |
| 435,037 | Galloway | Aug. 26, 1890 |
| 1,974,466 | Marshburn | Sept. 25, 1934 |
| 2,340,163 | White | Jan. 25, 1944 |
| 2,362,660 | Moyer et al. | Nov. 14, 1944 |
| 2,554,637 | Rerick | May 29, 1951 |
| 2,742,200 | Marx | Apr. 17, 1956 |

OTHER REFERENCES

Publications: Modern Plastics Encyclopedia vol. 32, No. 1A; September 1954. Only pages 450, 477, 478 and 541–543 required.

John Deere Operator's Manual OM-B2-453, Received in Scientific Library on Sept. 1, 1955; only pages 21–24, 70 and 71 required.

Machines for Power Farming—Stone; 1957, only pages 329 and 330 required.

Polyethylene-Properties and Uses—publication, The Society of Plastic Engineers, Inc. October 17, 1957. Only pages 41, 42 required.